United States Patent
Jansma et al.

(10) Patent No.: US 11,104,260 B2
(45) Date of Patent: Aug. 31, 2021

(54) ANGLED TIE DOWN ANCHORS

(71) Applicant: Toyota Motor Engineering & Manufacturing North America, Inc., Plano, TX (US)

(72) Inventors: Matthew A. Jansma, Saline, MI (US); Christopher M. Higgins, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 11 days.

(21) Appl. No.: 16/261,040

(22) Filed: Jan. 29, 2019

(65) Prior Publication Data

US 2020/0238889 A1  Jul. 30, 2020

(51) Int. Cl.
| | |
|---|---|
| *B60P 7/08* | (2006.01) |
| *B60P 3/00* | (2006.01) |
| *B60R 9/08* | (2006.01) |
| *B60R 7/08* | (2006.01) |
| *B60R 9/00* | (2006.01) |

(52) U.S. Cl.
CPC ............. *B60P 7/0807* (2013.01); *B60P 3/007* (2013.01); *B60R 7/08* (2013.01); *B60R 9/00* (2013.01); *B60R 9/08* (2013.01)

(58) Field of Classification Search
CPC .......... B60P 7/0807; B60P 3/007; B60R 7/08; B60R 9/00; B60R 9/08

USPC ........ 410/101, 102, 106, 109, 110, 112, 113, 410/116
See application file for complete search history.

(56) References Cited

U.S. PATENT DOCUMENTS

| | | | | |
|---|---|---|---|---|
| 2,756,693 | A | * | 7/1956 | Frost |
| 4,592,583 | A | | 6/1986 | Dresen et al. |
| 5,673,956 | A | | 10/1997 | Emery |
| 6,203,090 | B1 | | 3/2001 | Vitoorapakorn |
| 6,478,356 | B1 | | 11/2002 | Wayne |
| 9,884,578 | B2 | * | 2/2018 | Stojkovic .................. B60P 7/08 |
| 10,023,097 | B1 | * | 7/2018 | Harris ................... B60P 7/0807 |
| 2012/0251261 | A1 | * | 10/2012 | Liu ........................ B60P 7/0815 410/106 |
| 2013/0034401 | A1 | * | 2/2013 | Sauerwald ............ B60P 7/0876 410/101 |
| 2015/0071727 | A1 | * | 3/2015 | Hemphill .............. B60P 7/0807 410/110 |
| 2019/0337441 | A1 | * | 11/2019 | Marchlewski ........ B60P 7/0807 |

* cited by examiner

*Primary Examiner* — Stephen T Gordon
(74) *Attorney, Agent, or Firm* — Christopher G. Darrow; Darrow Mustafa PC

(57) ABSTRACT

A bed for a vehicle can include tie down anchors that extend at an acute angle relative to the longitudinal direction of the vehicle. As a result, the tie down anchors can match a loading direction of a strap or other securement device, thereby minimizing or avoiding bending moments on the tie down anchors. The bed can include a tie down flange provided at an interface between a transverse wall and a side wall of the bed. A recess being defined on an outer side of the bed at the location of the tie down flange. A tie down anchor operatively connected to the tie down flange.

20 Claims, 9 Drawing Sheets

ANGLED TIE DOWN ANCHORS

FIELD

The subject matter described herein relates in general to vehicles and, more particularly, to vehicle cargo areas.

BACKGROUND

Some motor vehicles have storage spaces located behind a passenger seating area. For example, pickup trucks are motor vehicles with a rear open top cargo area, which is commonly referred to as a bed, located behind a passenger cabin. The bed allows the vehicle to be utilized in many different ways, including carrying or storing various types of cargo (e.g., tools, groceries, sporting equipment, etc.). Some beds can include features to facilitate the securing of cargo loaded within the bed, such as tie down members.

SUMMARY

In one respect, the subject matter described herein is directed to a bed for a vehicle. The bed includes a bed body with a floor, a first side wall, a second side wall, and a transverse wall. The bed includes a tie down flange at an interface between the transverse wall and the first side wall. A recess can be defined on an outer side of the bed at the tie down flange. A tie down anchor can be operatively connected to the tie down flange. The tie down anchor can extend at an acute angle relative to a longitudinal direction of the vehicle.

In another respect, the subject matter described herein is directed to a bed for a vehicle. The bed includes a bed body with a floor, a first side wall, a second side wall, a front wall, and a back end. The bed includes a tie down flange provided at an interface between the front wall and the first side wall. A recess can be defined on an outer side of the bed at the tie down flange. The bed can include a first tie down anchor operatively connected to the tie down flange. The first tie down anchor can extend at an acute angle relative to a longitudinal direction of the vehicle. The bed can include a second tie down anchor provided near the second side wall at or near the back end. The second tie down anchor can extend at an acute angle relative to the longitudinal direction of the vehicle. The first tie down anchor can be substantially aligned with the second tie down anchor.

DETAILED DESCRIPTION

Figure 1:
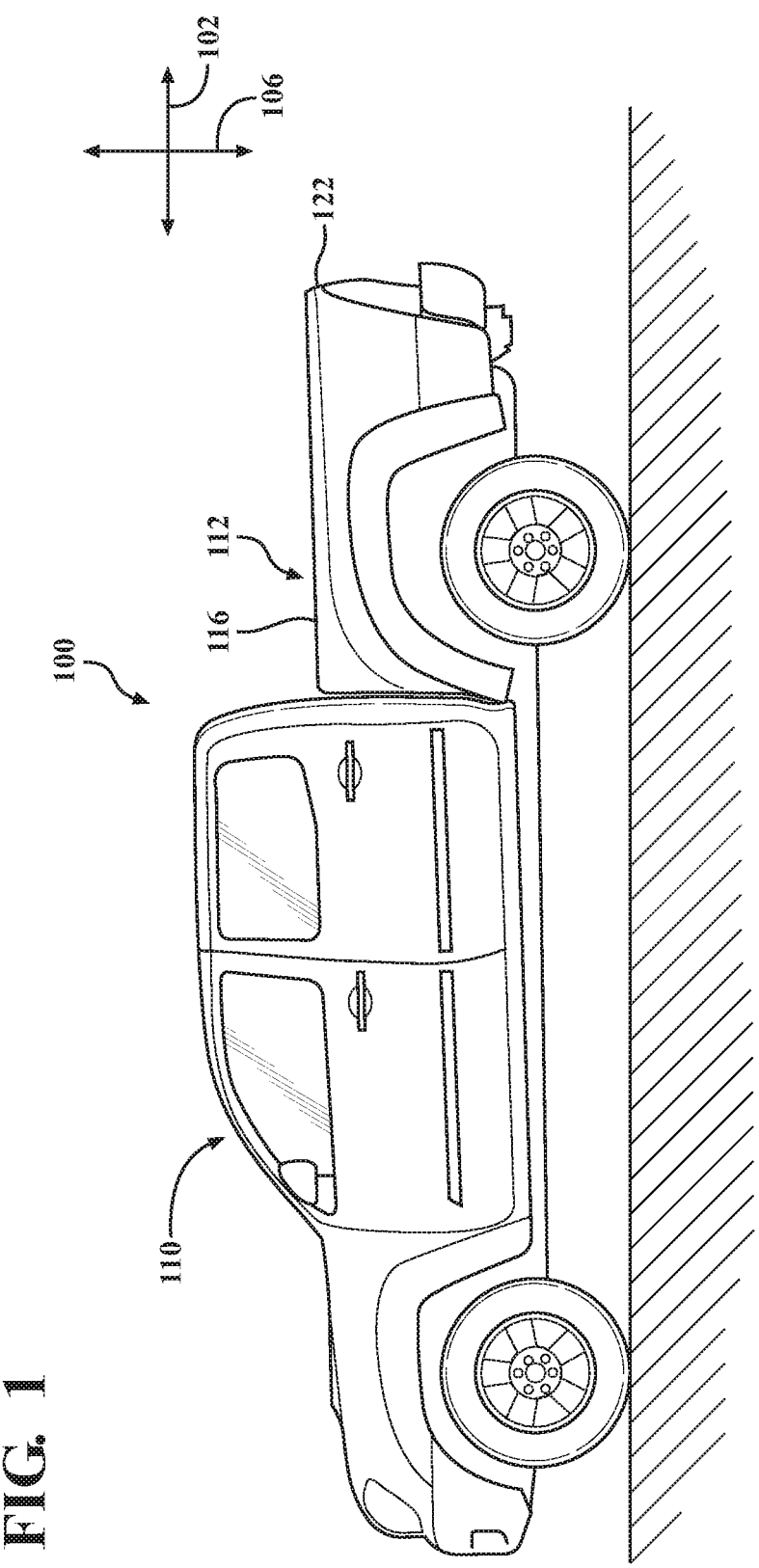
FIG. 1 is an example of a pick-up truck.

Tie down members have been provided on the left and right side walls of a bed. These tie down members extend perpendicular to the side walls and in a lateral direction of the vehicle. Users typically utilize the tie down members to secure cargo by straps. The straps extend across the bed between diagonally opposed tie down members. Consequently, the force of the strap exerts a bending moment on the tie down members. When subjected to these forces over time, the tie down member and/or the vehicle structures to which the tie down members are attached may eventually fail.

Accordingly to arrangements herein, a bed can include tie down anchors that extend at an acute angle relative to the longitudinal direction of the vehicle. As a result, the tie down anchors can match a loading direction of a strap or other securement device, thereby minimizing or avoiding bending moments on the tie down anchors. The bed can include a tie down flange at an interface between a transverse wall (e.g., a front wall or a back wall) and a side wall of the bed. A recess can be defined on an outer side of the bed at the location of tie down flange. A tie down anchor can be operatively connected to the tie down flange by fasteners and corresponding retention members. The retention members can be provided in the recess for engaging the one or more fasteners.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 shows an example of a vehicle 100. As used herein, "vehicle" means any form of motorized transport. In one or more implementations, the vehicle 100 can be a pick-up truck or a sport utility vehicle. While arrangements will be described herein with respect to a pick-up truck, it will be understood that embodiments are not limited to pick-up trucks.

Figure 2:
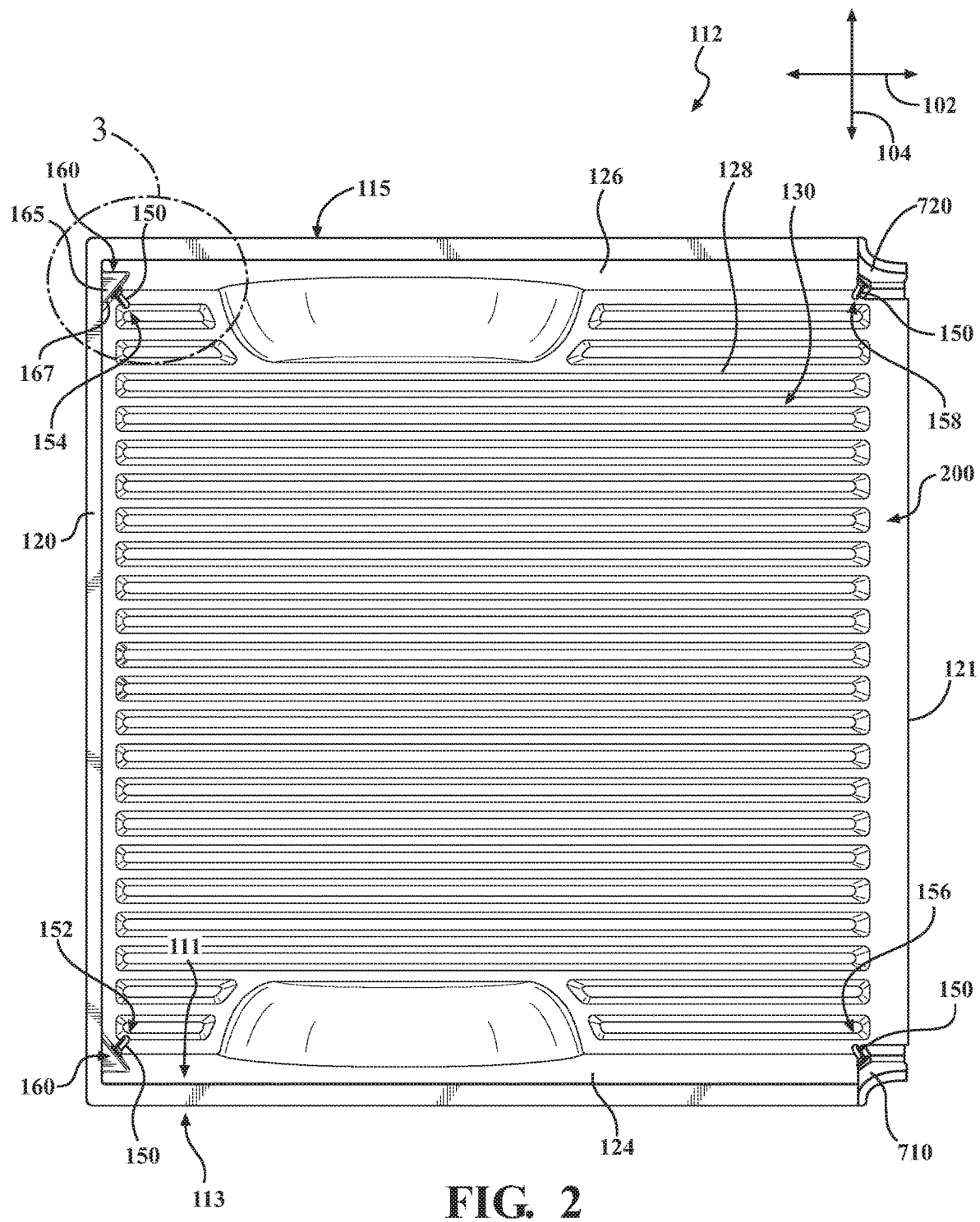
FIG. 2 is a view of a bed of the pick-up truck.

The vehicle 100 can have an associated longitudinal direction 102 (see FIGS. 1 and 2). The longitudinal direction 102 can generally extend in the forward-rearward direction of the vehicle 100 (i.e., in the left-right direction of FIG. 1). The vehicle 100 can have an associated lateral direction 104 (see FIGS. 2 and 8), which can be substantially perpendicular to the longitudinal direction 102. As used herein, the terms "substantially" or "about" include exactly the term being modified and slight variations therefrom (e.g., within normal manufacturing tolerances, within about 15 percent (or degrees or other units) or less, within about 10 percent or less, within about 9 percent or less, within about 8 percent or less, within about 7 percent or less, within about 6 percent or less, within about 5 percent or less, within about 4 percent or less, within about 3 percent or less, within about 2 percent or less, or within about 1 percent or less). The lateral direction 104 can generally extend in the left-right direction of the vehicle 100 (i.e., in the up-down direction of FIG. 2). The vehicle 100 can have an associated elevational direction 106 (see FIGS. 1 and 8). The elevational direction 106 can generally extend in the top-bottom direction of the vehicle 100 (i.e., in the up-down direction of FIG. 1).

The vehicle 100 can include a cabin 110 and a bed 112. The cabin 110 and the bed 112 can be substantially proximate to each other. The cabin 110 can be a compartment or seating area for passengers. The bed 112 can allow the vehicle 100 to be utilized in many different ways, including carrying or storing various types of cargo (e.g., tools, groceries, sporting equipment, etc.). The bed 112 can have an open top 116. In some instances, the open top 116 of the bed 112 can be at least partially closed by a tonneau cover, topper, or other element.

Referring to FIGS. 1 and 2, the bed 112 can include a bed body 115. The bed body 115 can include a front wall 120, a first side wall 124, a second side wall 126, and a floor 128. The bed 112 can include a back end 121. In some instances, the bed 112 can include a back wall. In other instances, a rear portion of the bed 112 can be selectively opened and closed by a movable back wall (e.g., a tailgate 122). The movable back wall can be separate structure from the bed 112.

The bed 112 can define a space 130. In one or more arrangements, the space 130 can be substantially rectangular. The first side wall 124 and the second side wall 126 can be substantially parallel to each other. The front wall 120 and the back wall (when closed if movable) can be substantially parallel to each other. The front wall 120, the first side wall 124 and the second side wall 126 can be substantially perpendicular to the floor 128. The bed 112 can include an inner side 111 and an outer side 113. Generally, the inner side 111 includes the inner surfaces of the bed 112 that define and/or face the space 130, and the outer side 113 defines the exterior surfaces of the bed 112, that is, the surfaces that do not define and/or face the space 130. In some instances herein, reference may be made to a transverse wall. A transverse wall is a wall that is substantially perpendicular to the floor 128 and that is substantially perpendicular to the first side wall 124 and the second side wall 126. The transverse wall can be the front wall 120 and/or the back wall.

The bed 112 can be made of any suitable material. In one or more arrangements, the bed 112 can be made of a resin or polymeric material. For instance, the bed 112 can be made of reinforced resin (e.g., fiber reinforced, glass reinforced, carbon fiber reinforced, etc.), sheet molded composite (SMC), injection molded composite, reinforced plastic, and/or fiber reinforced plastic, just to name a few possibilities. In some instances, the bed 112 can be made of a lightweight metal, such as aluminum. The bed 112 can be formed as a single structure. Thus, the front wall 120, the first side wall 124, the second side wall 126, and the floor 128 can be a unitary structure. In some instances, a back wall can be a part of the unitary structure. The bed 112 can be attached to the vehicle 100 in any suitable manner, now known or later developed. Portions of the bed 112 can be covered by outer body panels of the vehicle 100. Such outer body panels can to provide protection, aerodynamics, and/or aesthetics.

According to arrangements described herein, the bed 112 can include a plurality of tie down anchors 150. The tie down anchors 150 can be any type of tie down anchor, now know or later developed. In some arrangements, the tie down anchors 150 can have a D-ring, V-ring, U-ring, ring-like, or hook like configuration.

The tie down anchors 150 can be provided in various places within the bed 112. For instance, one or more tie down anchors 150 can be provided at or near an interface 152 between the front wall 120 and the first side wall 124. One or more tie down anchors 150 can be provided at or near an interface 154 between the front wall 120 and the second side wall 126. In some arrangements, a plurality of tie down anchors 150 can be provided at these locations. The plurality of tie down anchors 150 can be distributed in any suitable manner at or near the respective interface(s) 152, 154. For instance, the plurality of tie down anchors 150 can be distributed along the elevational direction 106 at or near the respective interface(s) 152, 154.

One or more tie down anchors 150 can be provided at or near an interface 156 between the first side wall 124 and the back wall and/or the back end 121. One or more tie down anchors 150 can be provided at or near an interface 158 between the second side wall 126 and the back wall and/or the back end 121. In some arrangements, a plurality of tie down anchors 150 can be provided at these locations. The plurality of tie down anchors 150 can be distributed in any suitable manner at or near the respective interface(s) 156, 158. For instance, the plurality of tie down anchors 150 can be distributed along the elevational direction 106 at or near the respective interface(s) 156, 158.

In one or more arrangements, the plurality of tie down anchors 150 can be substantially identical to each other in size, shape, configuration, orientation, features, and in any other respect. However, in one or more arrangements, one or more of the tie down anchors 150 can be different from one or more of the other tie down anchors 150 in at least one respect. The position and/or orientation of the tie down anchors 150 can be fixed. Thus, the tie down anchors 150 do not move or are not intended to move.

Figure 3:
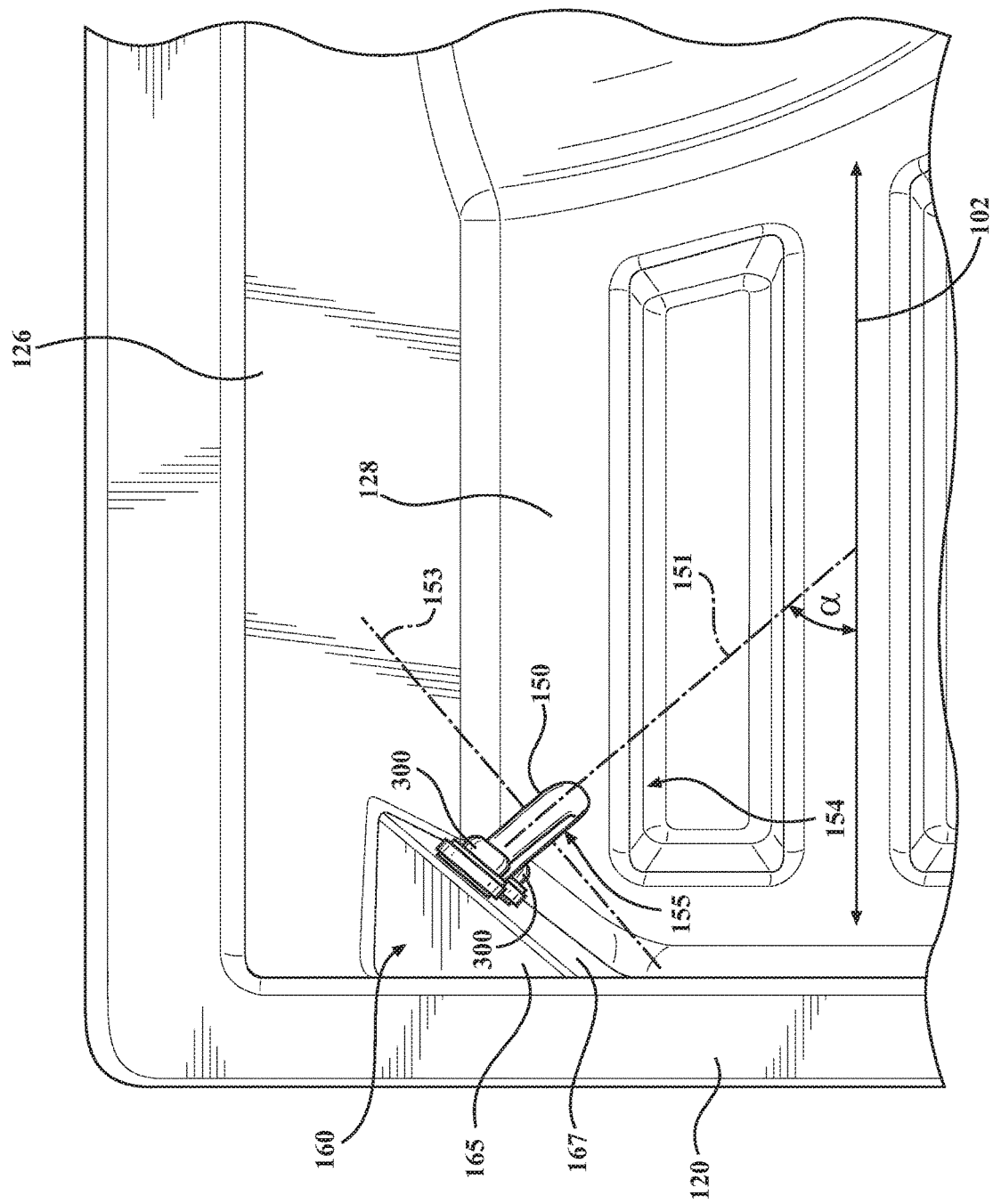
FIG. 3 is a view of a portion of the bed of the pick-up truck, showing a tie down anchor angled relative to a longitudinal direction of the vehicle.

The tie down anchors 150 can have any suitable orientation. Referring to FIG. 3, the tie down anchors 150 can have an associated body axis 151. The body axis 151 can be defined by the overall direction in which the tie down anchors 150 extend. Alternatively or in addition, the body axis 151 can be defined by an axis of symmetry of the tie down anchors 150.

The body axis 151 can extend at an angle α relative to the longitudinal direction 102 of the vehicle 100. In one or more arrangements, the angle α can be an acute angle. In one or more arrangements, the angle α can be about 70 degrees or less, about 65 degrees or less, about 60 degrees or less, about 55 degrees or less, about 50 degrees or less, about 45 degrees or less, about 40 degrees or less, about 35 degrees or less, about 30 degrees or less, about 25 degrees or less, or about 20 degrees or less. The angle α can vary depending on the dimensions of the bed 112, such as the length of the bed 112 in the longitudinal direction 102.

In some arrangements, the tie down anchors 150 can have one or more apertures 155. The aperture(s) 155 can have an aperture axis 153. The aperture axis 153 can have any suitable orientation. In one or more arrangements, the aperture axis 153 can extend substantially horizontally. In one or more arrangements, the aperture axis 153 can extend substantially vertically. In one or more arrangements, the aperture axis 153 can be substantially parallel to the floor 128 of the bed 112. In one or more arrangements, the aperture axis 153 can be substantially perpendicular to the floor 128 of the bed 112.

The tie down anchors 150 can be operatively connected at or near an interface between two walls of the bed 112 in any suitable manner. As used herein, the term "operatively connected," as used throughout this description, can include direct or indirect connections, including connections without direct physical contact. In one or more arrangements, one or more of the tie down anchors 150 can be operatively connected to a connecting structure, such as a tie down flange 160, that joins two walls of the interface. For instance, a tie down flange 160 can extend between the front wall 120 and the first side wall 124, and a tie down flange 160 can extend between the front wall 120 and the second side wall 126. The tie down flange 160 can be formed in the bed 112 in any suitable manner. For example, in one or more arrangements, the tie down flange 160 can be formed with the respective walls of the bed 112 as a unitary structure.

The tie down flange 160 can have any suitable configuration. In one or more arrangements, the tie down flange 160 can include an upper portion 165. The upper portion 165 can extend substantially horizontally and/or substantially parallel to the floor 128. In one or more arrangements, the tie down flange 160 can include a tie down attachment portion 167. The tie down attachment portion 167 can extend substantially vertically. In one or more arrangements, the tie down attachment portion 167 can be substantially perpendicular to the floor 128. In one or more arrangements, the tie down attachment portion 167 can be substantially perpendicular to the upper portion 165.

Figure 4:
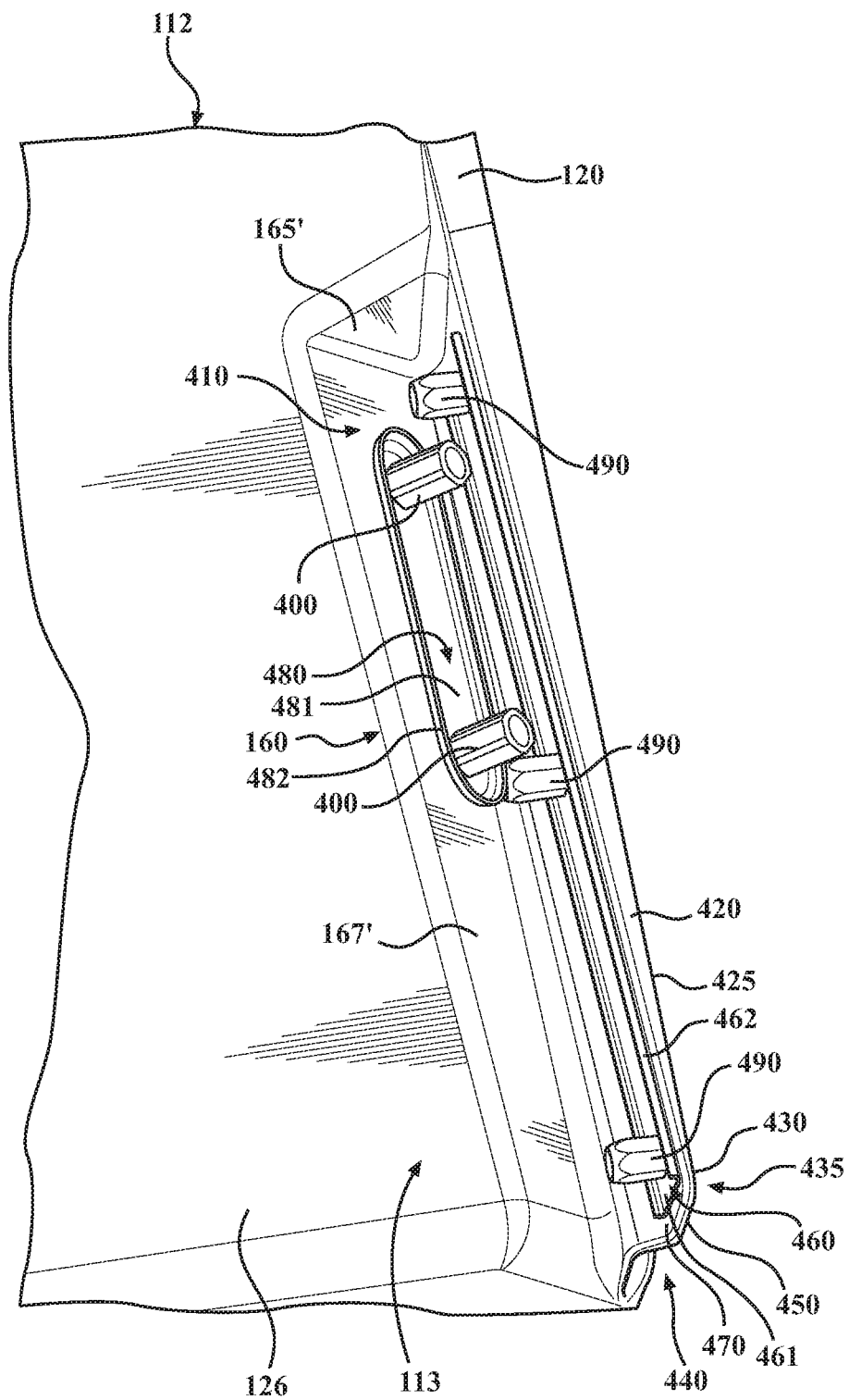
FIG. 4 is a view of an outer side of the bed, showing a recess formed at the location of a tie down flange.
Figure 5:
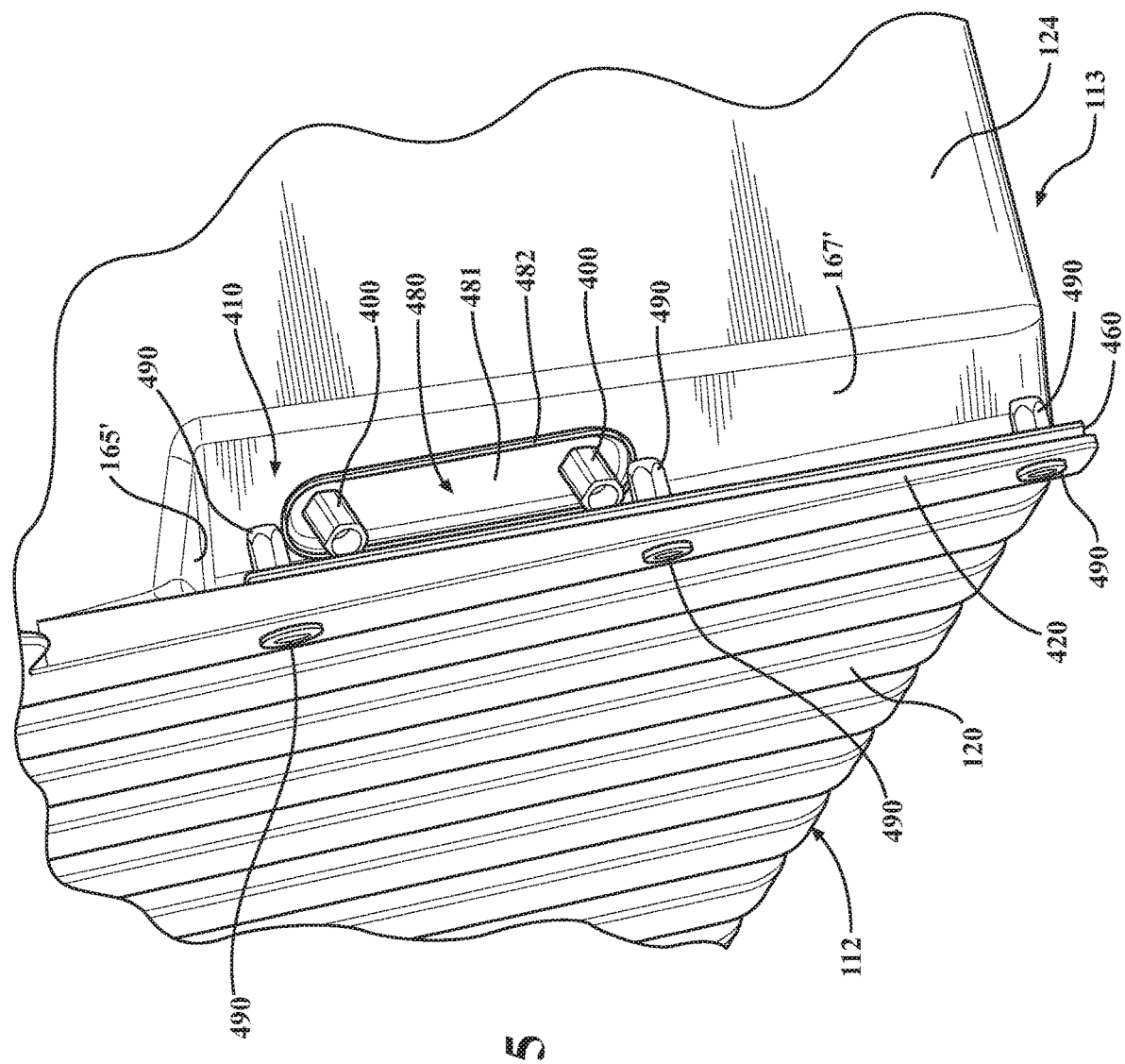
FIG. 5 is another view of the outer side of the bed, showing the recess formed at the location of the tie down flange.
Figure 6:
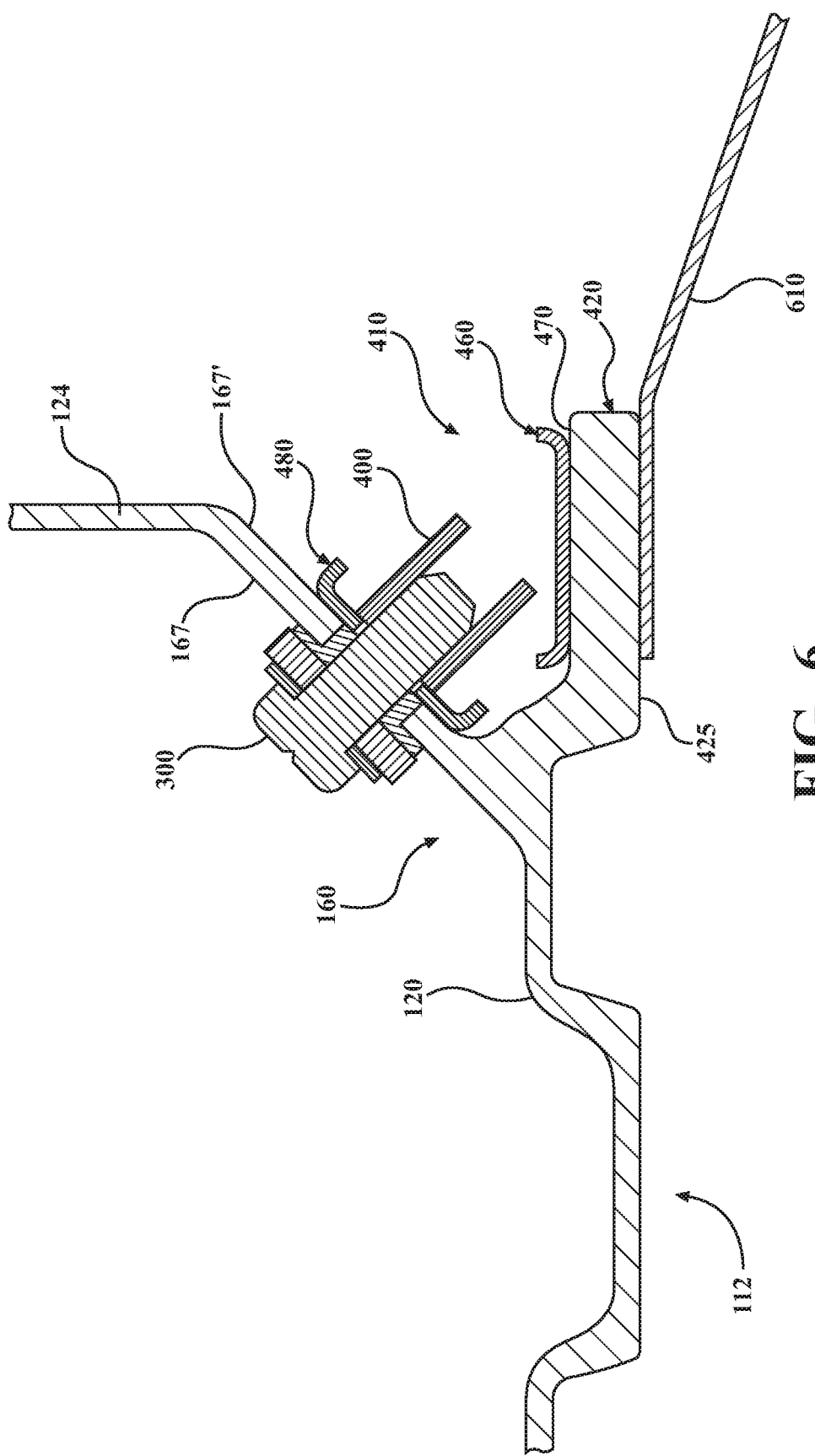
FIG. 6 is a cross-sectional view of a portion of the bed at the tie down flange.

The tie down anchors 150 can be connected to the tie down flange 160 in any suitable manner. For instance, the tie down anchors 150 can be connected to the tie down flange 160 by one or more fasteners, one or more adhesives, one or more welds, one or more forms for brazing, and/or one or more forms of mechanical engagement, just to name a few possibilities. In one or more arrangements, the tie down anchors 150 can be attached to the tie down flange 160 by a plurality of fasteners 300, which can be, for example, bolts, screws, rivets, or studs. In some arrangements, the fasteners 300 can include male threads. The fasteners 300 can engage retention members 400 (e.g., nuts, rivet nuts, blind rivet nuts, or other retainers) on an outer side of the tie down flange 160, as is shown in FIGS. 4-6. The retention members 400 can include internal female threads. The tie down anchors 150 can extend away from the tie down flange 160 and into the bed 112.

Referring to FIGS. 4-6, outer views of portion of the bed 112 at the tie down flange 160 are shown. A recess 410 can be defined in the bed 112 at the location of the tie down flange 160. More particularly, the recess 410 can be defined by a front wall extension 420, the respective side wall (e.g., first side wall 124 or second side wall 126), and/or one or more outer surfaces of the tie down flange 160 (e.g., outer surface 165' of the upper portion 165, outer surface 167' of the tie down attachment portion 167). In the arrangements, shown in FIGS. 4-6, the recess 410 can have a substantially triangular prism shape. However, it will be appreciated that other shapes for the recess 410 are possible. The recess 410 can open to an outer side of the bed 112. More particularly, a portion of the recess 410 can open to a side wall of the bed 112 and/or a portion of the recess 410 can open to the bottom of the bed 112.

The front wall extension 420 can extend from the front wall 120 of the bed 112. In some arrangements, the front wall extension 420 can taper to an edge region 430 as the extension approaches a lower corner section 435. Such tapering can occur in the thickness and/or length of the front wall extension 420. The tapered edge region 430 can facilitate the manufacturing of the bed 112. More particularly, the tapered edge region 430 can facilitate the use of a single die to form the bed 112. The tapered edge region 430 can correspond with die draft angles and/or the direction(s) of separation of the die.

Further, the front wall extension 420 can include a step 440. The step 440 can help to position an attachment portion 450 in a suitable location. The attachment portion 450 can be used for securing the bed 112 to an outer body panel 630 (FIG. 7) of the vehicle 100.

In one or more arrangements, a backing plate 480 can be positioned against an outer surface 167' of the angled tie down flange 160 at the location where the tie down anchor 150 is attached. The backing plate 480 can reinforce the connection between the tie down anchor 150 and the angled tie down flange 160. The backing plate 480 can also provide a smooth contact area and avoiding clamping directly to the bed 112. The backing plate 480 can help to distribute loads exerted by the tie down anchor 150 across a larger area of the bed 112, thereby minimizing stress concentrations. The backing plate 480 can be made of any suitable material. In one or more arrangements, the backing plate 480 can be made of steel or aluminum.

The backing plate 480 can include a substantially planar portion 481 and a lip 482. The transition between the substantially planar portion 481 and the lip 482 can be rounded or otherwise smooth. The lip 482 can further help in distribution loads from the tie down anchor 150. The lip 482 can further avoid the use of sharp edges or corners on the backing plate 480, which can beneficially avoid contact between such features and the bed 112.

Figure 7:
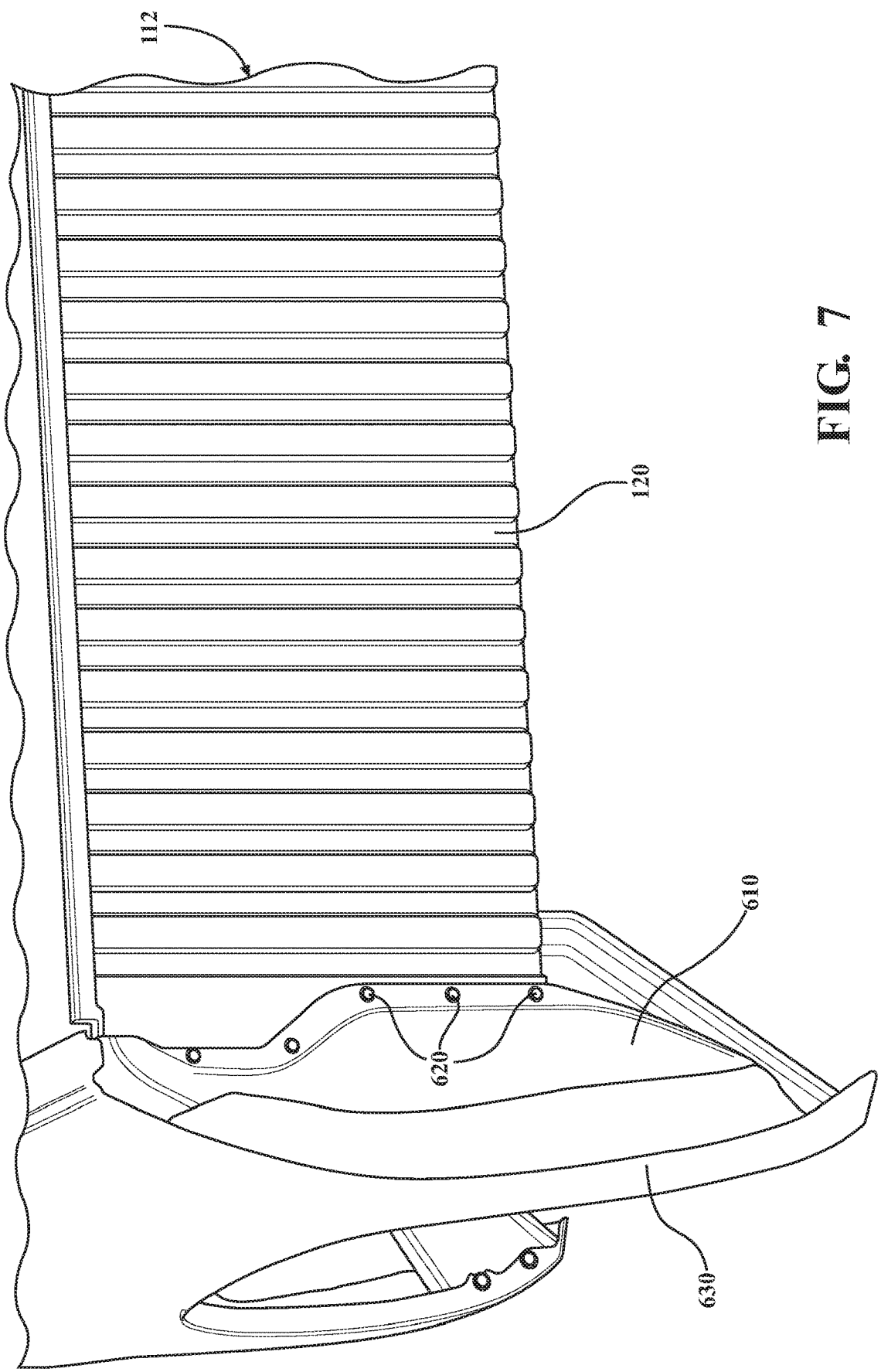
FIG. 7 is a view of a portion of the bed, showing the bed operatively connected to an outer body panel by a connecting panel.

As noted above, portions of the bed 112 can be at least partially covered by outer body panels of the vehicle 100. FIG. 7 shows an example of the bed 112 being operatively connected to an outer body panel 630. In one or more arrangements, the bed 112 can be directly connected to the outer body panel 630. In one or more arrangements, the bed 112 can be indirectly connected to the outer body panel 630, such as by a connecting plate 610. The connecting plate 610 can be attached to the bed 112 in any suitable manner. For instance, the connecting plate 610 can attached to the bed 112 using one or more fasteners 620, which can be, for example, bolts, screws, rivets, or studs. In some arrangements, the fasteners 620 can include male threads. The fasteners 620 can be engage retention members 490 (e.g., nuts, rivet nuts, blind rivet nuts, or other retainers) on an outer side of the tie down flange 160, as is shown in FIGS. 4-5. The retention members 490 can include internal female threads. The connecting plate 610 can attach to the outer body panel 630 in any suitable manner, such as one or more fasteners, one or more welds, one or more forms of mechanical engagement, and/or one or more adhesives, just to name a few possibilities.

A backing plate 460 can be secured to a recess-facing surface 470 of the front wall extension 420. The backing plate 460 can provide additional support/reinforcement for a connection to other vehicle structures mounted to an outer surface 425 of the front wall extension 420. In one or more arrangements, the front wall extension 420 can be connected to the vehicle body panel by one or more fasteners. In such case, retention members 490 can be used to engage the fastener(s).

The backing plate 460 can also provide a smooth contact area and avoiding clamping directly to the bed 112. The backing plate 460 can help to distribute loads exerted by the connecting plate 610 across a larger area of the bed 112, thereby minimizing stress concentrations. The backing plate 460 can be made of any suitable material. In one or more arrangements, the backing plate 460 can be made of steel or aluminum.

The backing plate 460 can include a substantially planar portion 461 and a lip 462. The transition between the substantially planar portion 461 and the lip 462 can be rounded or otherwise smooth. The lip 482 can further help in distribution loads from the connecting plate 610. The lip 482 can further avoid the use of sharp edges or corners on the backing plate 460, which can beneficially avoid contact between such edges and the bed 112.

It will be appreciated that the recess 410 can provide space to accommodate the retention members 400 to allow for the connection of the tie down anchors 150 to the tie down flange 160 by fasteners 300. The recess 410 can also provide space to accommodate the retention members 490 to allow for the connection of the bed 112 to the outer body panel 630.

Figure 8:
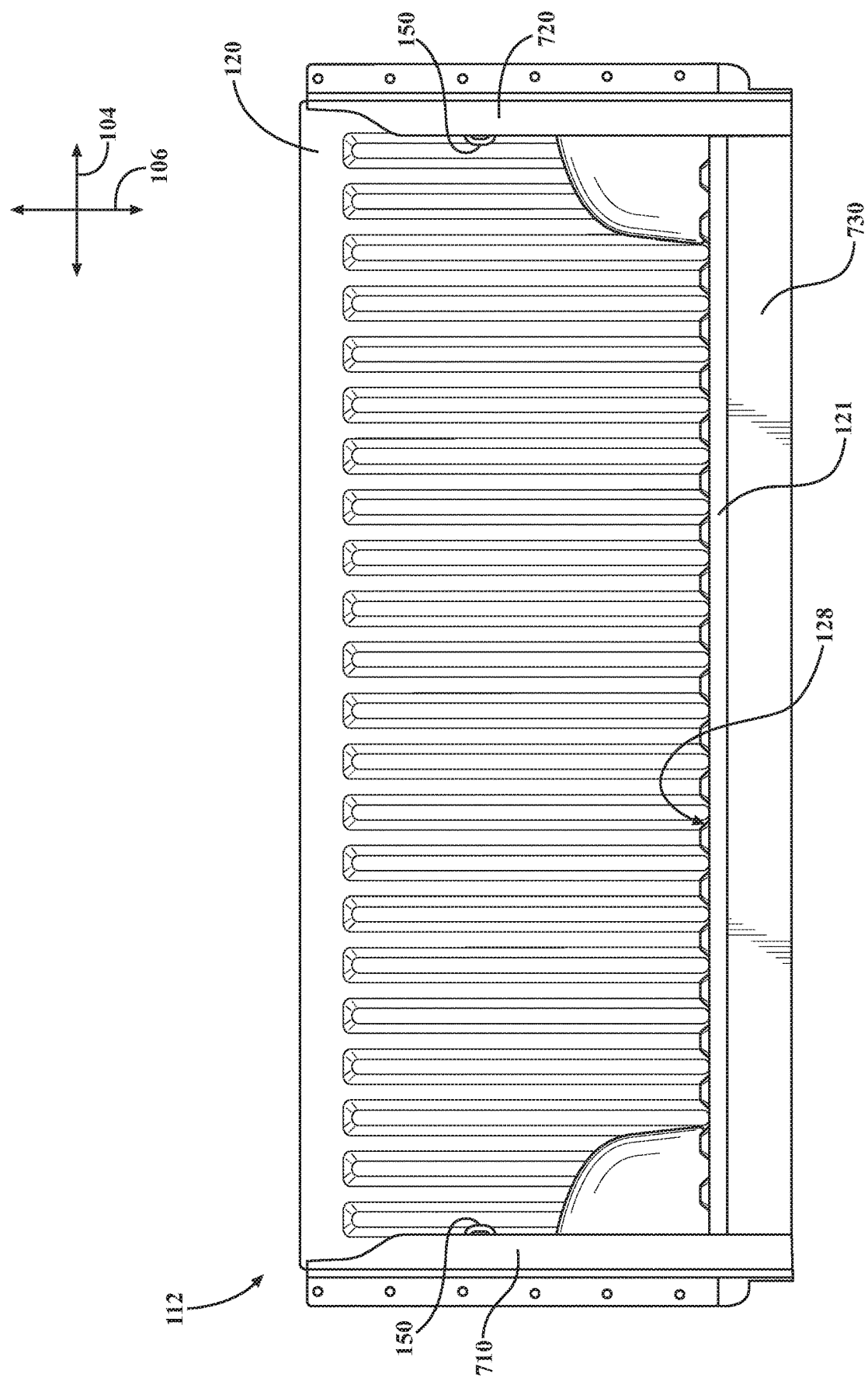
FIG. 8 is a view of a back end of the bed, showing posts on which tie down anchors are provided.

It will be appreciated that, in some arrangements, the bed 112 may not have a rear wall as a fixed part of the bed body 115. Thus, the tie down anchors 150 can be provided in a different manner than at the front of the bed 112. One example of a rear portion of the bed 112 is shown in FIG. 8. The bed 112 can include a first post 710 and a second post 720 (see also FIG. 2). The first post 710 and the second post 720 can extend substantially vertically and/or substantially perpendicular to the floor 128. The first post 710 and the second post 720 can be substantially parallel to each other. The first post 710 and the second post 720 can be made of any suitable material such as steel or aluminum, sheet metal, reinforced resin, etc. The first post 710 and the second post 720 can be made in any suitable manner, such as by casting or by machining.

The first post 710 and the second post 720 can be operatively connected to each other. For instance, a cross member 730 can extend substantially in the lateral direction 104. The cross member 730 can extend below the floor 128 of the bed 112. The first post 710 and the second post 720 can be operatively connected to the cross member 730 in any suitable manner. For instance, the first post 710 and the second post 720 can be operatively connected to the cross member 730 by one or more fasteners, one or more welds, one or more forms of adhesive, one or more forms of mechanical engagement, and/or combinations thereof. The first post 710 and the second post 720 along with the cross member 730 can collectively form a substantially U-shaped structure. The first post 710 and the second post 720 can be operatively connected to the bed 112 in any suitable manner. In one or more arrangements, the cross member 730 can be operatively connected to a frame of the vehicle 100. The first post 710 and the second post 720 can be substantially perpendicular to the cross member 730.

One or more tie down anchors 150 can be operatively connected to the first post 710 and/or the second post 720 in any suitable manner. For instance, the tie down anchors 150 can be connected to the first post 710 and/or the second post 720 by one or more fasteners, one or more adhesives, one or more welds, one or more forms for brazing, and/or one or more forms of mechanical engagement, just to name a few possibilities. The tie down anchors 150 can extend away from the first post 710 and/or the second post 720 and into the bed 112. The tie down anchors 150 can extend at an acute angle relative to the longitudinal direction 102 of the vehicle 100. The above description of the tie down anchors 150 near the front wall 120 of the bed 112 applies equally to the tie down anchors 150 near the rear of the bed 112.

It should be noted that the above-described arrangements for the tie down anchors 150 at or near the back end 121 of the bed 112 are merely provided as an example. Indeed, it will be appreciated that the tie down anchors 150 can be provided at or near the back end 121 of the bed 112 in various different ways. For instance, the tie down flange 160 described above at the interfaces 152, 154 can also be used at or near the back end 121 of the bed 112. For example, if the bed 112 includes a rear wall, then a tie down flange 160 can be provided at the interface 156 between the first side wall 124 and the rear wall, and a tie down flange 160 can be provided at the interface 158 between the second side wall 126 and the rear wall. Alternatively, a tie down flange 160 can be provided at an interface between the first side wall 124 and some other structure near the back end 121 of the bed 112, and a tie down flange can be provided at an interface between the second side wall 126 and some other structure near the back end 121 of the bed 112. The description of the tie down flanges 160 herein applies equally to tie down flanges 160 provided at or near the back end 121 of the bed 112.

The plurality of tie down anchors 150 can have any suitable relationship with each other. For instance, the tie down anchors 150 at or near the front wall 120 of the bed 112 can be substantially aligned with each other in the longitudinal direction 102, the lateral direction 104, and/or the elevational direction 106. Alternatively, the tie down anchors 150 at or near the front wall 120 of the bed 112 can be offset from each other in one or more of these directions. Further, the tie down anchors 150 at or near the back end 121 of the bed 112 can be substantially aligned with each other in the longitudinal direction 102, the lateral direction 104, and/or the elevational direction 106. Alternatively, the tie down anchors 150 at or near the back end 121 of the bed 112 can be offset from each other in one or more of these directions.

The tie down anchors 150 at or near the back end 121 of the bed 112 can have any suitable relationship with the tie down anchors 150 at or near the front wall 120 of the bed 112. In one or more arrangements, the body axis 151 of the tie down anchor 150 located at the interface 152 between the front wall 120 and the first side wall 124 can be substantially aligned with the body axis 151 of the tie down anchor 150 located at or near the interface 158 between the second side wall 126 and the back wall (when closed). "Substantially aligned with" can include the body axes 151 being substantially co-linear, substantially coplanar, and/or substantially parallel and in close proximity (e.g., within 6 inches or less, 5 inches or less, 4 inches or less, 3 inches or less, 2 inches or less, 1 inch or less, 0.5 inches or less). In one or more arrangements, the body axis 151 of the tie down anchor 150 located at the interface 154 between the front wall 120 and the second side wall 126 can be substantially aligned with the body axis 151 of the tie down anchor 150 located at or near the interface 156 between the back wall (when closed) and the first side wall 124.

In one or more arrangements, the aperture axis 153 of the tie down anchor 150 located at the interface 152 between the front wall 120 and the first side wall 124 can be substantially parallel to the aperture axis 153 of the tie down anchor 150 located at or near the interface 158 between the back wall (when closed) and the second side wall 126. In one or more arrangements, the aperture axis 153 of the tie down anchor 150 located at the interface 154 between the front wall 120 and the second side wall 126 can be substantially parallel to the aperture axis 153 of the tie down anchor 150 located at or near the interface 156 between the back wall (when closed) and the first side wall 124.

Figure 9:
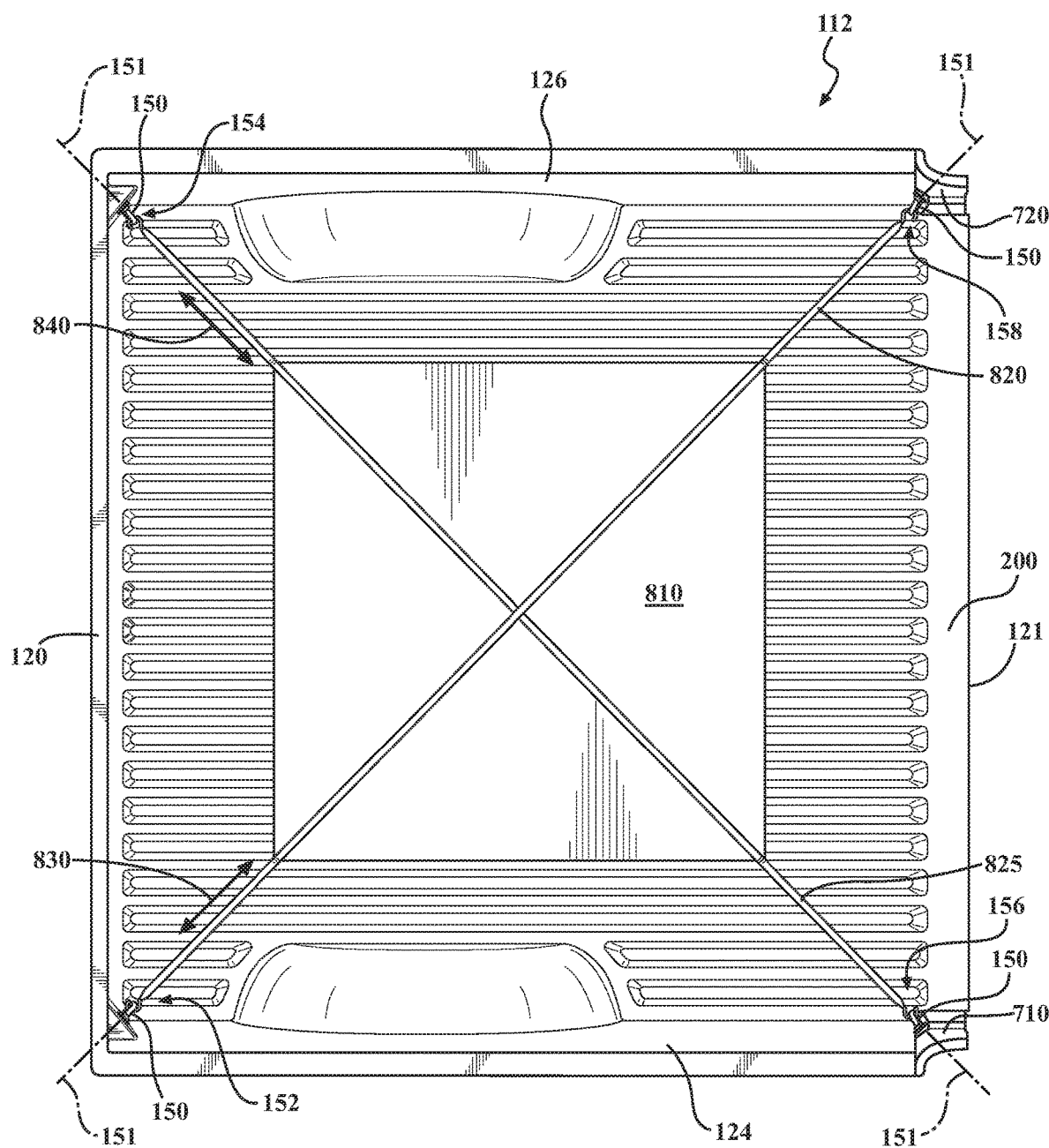
FIG. 9 is a view of the bed of the pick-up truck, showing an item strapped within the bed using the tie downs anchors.

A non-limiting example of the above-described arrangements will be described in relation to FIG. 9. One or more items 810 can be placed in the bed 112. In some instances, the one or more items 810 can be secured in place using one or more straps, one or more ropes, one or more cables, one or more tethers, one or more chains, and/or one or more other securement devices. As an example, one end of a strap 820 can be connected to the tie down anchor 150 located at or near the interface 152 between the front wall 120 and the first side wall 124, and the other end of the strap 820 can be connected to the tie down anchor 150 located at or near the interface 158 between the back wall (when closed) and the second side wall 126. Alternatively or in addition, one end of a strap 825 can be connected to the tie down anchor 150 located at or near the interface 154 between the front wall 120 and the second side wall 126, and the other end of the strap 825 can be connected to the tie down anchor 150 located at or near the interface 156 between the back wall (when closed) and the first side wall 124.

The straps 820, 825 or other securement devices can be connected to the tie down anchors 150 in any suitable manner, now known or later developed. In some instances, the straps 820, 825 or other securement devices can include one or more connectors (e.g., hooks, clips, carabiners, fasteners, straps, etc.) to facilitate connection to the tie down anchors 150. When secured, the straps 820, 825 can extend in a direction that is substantially aligned with the body axes 151 of the tie down anchors 150 to which they are attached. For example, the strap 820 can extend in a direction 830 that is substantially aligned with the body axis 151 of the tie down anchor 150 located at or near the interface 152 between the front wall 120 and the first side wall 124, as well as the body axis 151 of the tie down anchor 150 located at or near the interface 158 between the back wall (when closed) and the second side wall 126. Similarly, the strap 825 can extend in a direction 840 that is substantially aligned with the body axis 151 of the tie down anchor 150 located at or near the interface 154 between the front wall 120 and the second side wall 126, as well as the body axis 151 of the tie down anchor 150 located at or near the interface 156 between the back wall (when closed) and the first side wall 124.

It will be appreciated that arrangements described herein can provide numerous benefits, including one or more of the benefits mentioned herein. For example, tie down anchors that are angled relative to the longitudinal direction of the vehicle can result in the tie down anchors matching a loading direction of a strap or other securement device. Thus, the exertion of a bending moment by the strap on the tie down anchors can be minimized or prevented, which, in turn, can help to avoid damage or deformation to the tie down anchors and/or to the walls of the bed. Further, arrangements described herein can facilitate the bed being made using a single die, thereby avoiding the use of multiple, expensive dies and the subsequent step of joining a plurality of pieces to form the bed. Thus, arrangements described here can provide costs and structural strength benefits. The unique arrangements of the bed at the tie down flange can facilitate the use of a single die.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A bed for a vehicle comprising:
   a bed body including a floor, a first side wall, a second side wall, and a transverse wall, the bed body defining a bed space;
   a tie down flange provided at an interface between the transverse wall and the first side wall, a recess being defined in the bed at the tie down flange, the recess opening to an outer side of the bed at the first side wall, the recess further opening to the outer side of the bed at the floor, the outer side of the bed facing away from the bed space, the recess extending substantially in a direction from the floor toward a top of the bed body, the recess being at least partially defined by a first surface and a second surface that are angled relative to each other, the first surface being an outer surface of the tie down flange, the first side wall not defining the recess; and
   a tie down anchor operatively connected to the tie down flange, the tie down anchor extending at an acute angle relative to a longitudinal direction of the vehicle, the tie down anchor being a separate structure from the tie down flange, the tie down anchor extending away from the tie down flange and into the bed space.

2. The bed of claim 1, wherein the transverse wall, the first side wall, the second side wall, and the floor are formed as a unitary structure.

3. The bed of claim 2, wherein the tie down flange is formed as a unitary structure with the bed body.

4. The bed of claim 1, wherein the bed body is made of a reinforced plastic.

5. A bed for a vehicle comprising:
   a bed body including a floor, a first side wall, a second side wall, and a transverse wall; a tie down flange provided at an interface between the transverse wall and the first side wall, a recess being defined in the bed at the tie down flange, the recess opening to an outer side of the bed, the recess being substantially a triangular prism shape; and
   a tie down anchor operatively connected to the tie down flange, the tie down anchor extending at an acute angle relative to a longitudinal direction of the vehicle.

6. A bed for a vehicle comprising:
   a bed body including a floor, a first side wall, a second side wall, and a transverse wall;
   a tie down flange provided at an interface between the transverse wall and the first side wall, a recess being defined in the bed at the tie down flange, the recess opening to an outer side of the bed;
   a tie down anchor operatively connected to the tie down flange, the tie down anchor extending at an acute angle relative to a longitudinal direction of the vehicle; and
   a backing plate, the backing plate being operatively positioned between a recess facing surface of the tie down flange and one or more retention members provided in the recess, the one or more retention members being configured to engage one or more fasteners used to operatively connect the tie down anchor to the tie down flange.

7. The bed of claim 6, wherein the backing plate includes a planar portion and a lip.

8. A bed for a vehicle comprising:
a bed body including a floor, a first side wall, a second side wall, and a transverse wall; a tie down flange provided at an interface between the transverse wall and the first side wall, a recess being defined in the bed at the tie down flange, the recess opening to an outer side of the bed, a portion of the recess being defined by a transverse wall extension, the transverse wall extension being tapered in a plurality of directions; and
a tie down anchor operatively connected to the tie down flange, the tie down anchor extending at an acute angle relative to a longitudinal direction of the vehicle.

9. The bed of claim 1, further including an outer body panel operatively connected to the bed, and wherein the outer body panel covers at least a portion of one of the first side wall or the second side wall.

10. The bed of claim 9, further including a connecting panel, wherein the outer body panel is operatively connected to the bed by the connecting panel.

11. A bed for a vehicle comprising:
a bed body including a floor, a first side wall, a second side wall, and a transverse wall;
a tie down flange provided at an interface between the transverse wall and the first side wall, a recess being defined in the bed at the tie down flange, the recess opening to an outer side of the bed;
a tie down anchor operatively connected to the tie down flange, the tie down anchor extending at an acute angle relative to a longitudinal direction of the vehicle;
an outer body panel operatively connected to the bed, the outer body panel covering at least a portion of one of the first side wall or the second side wall;
a connecting panel, the outer body panel being operatively connected to the bed by the connecting panel; and
a backing plate, the backing plate being operatively positioned between a recess facing surface of the tie down flange and one or more retention members provided in the recess, the one or more retention members being configured to engage one or more fasteners used to operatively connect the connecting panel to the bed.

12. A bed for a vehicle comprising:
a bed body including a floor, a first side wall, a second side wall, a front wall, and a back end, the bed body defining a bed space;
a tie down flange provided at an interface between the front wall and the first side wall, a recess being defined in the bed at the tie down flange, the recess opening to an outer side of the bed at one of the first side wall and the second side wall, the recess further opening to the outer side of the bed at the floor, the outer side of the bed facing away from the bed space, the recess extending substantially in a direction from the floor toward a top of the bed body, the recess being at least partially defined by a first surface and a second surface that are angled relative to each other, the first surface being an outer surface of the tie down flange, the first side wall not defining the recess;
a first tie down anchor operatively connected to the tie down flange, the first tie down anchor extending at an acute angle relative to a longitudinal direction of the vehicle; and
a second tie down anchor provided near the second side wall at or near the back end, the second tie down anchor extending at an acute angle relative to the longitudinal direction of the vehicle,
the first tie down anchor being substantially aligned with the second tie down anchor, the first tie down anchor and the second tie down anchor being separate structures from the tie down flange, the first tie down anchor and the second tie down anchor extending away from the tie down flange and into the bed space.

13. The bed of claim 12, wherein the front wall, the first side wall, the second side wall, the floor, and the tie down flange are formed as a unitary structure.

14. The bed of claim 12, wherein the bed is made of a reinforced plastic.

15. A bed for a vehicle comprising:
a bed body including a floor, a first side wall, a second side wall, a front wall, and a back end;
a tie down flange provided at an interface between the front wall and the first side wall, a recess being defined in the bed at the tie down flange, the recess opening to an outer side of the bed;
a first tie down anchor operatively connected to the tie down flange, the first tie down anchor extending at an acute angle relative to a longitudinal direction of the vehicle;
a second tie down anchor provided near the second side wall at or near the back end, the second tie down anchor extending at an acute angle relative to the longitudinal direction of the vehicle, the first tie down anchor being substantially aligned with the second tie down anchor; and
a backing plate, the backing plate being operatively positioned between a recess facing surface of the tie down flange and one or more retention members provided in the recess, the one or more retention members are configured to engage one or more fasteners used to operatively connect the tie down anchor to the tie down flange.

16. The bed of claim 12, further including a post provided near the second side wall at or near the back end, the post being operatively connected to the bed body, the post extending substantially perpendicular to the floor, and wherein the second tie down anchor is operatively connected to the post.

17. The bed of claim 16, wherein the post is made of metal.

18. The bed of claim 16, further including a cross member, wherein the cross member extends in a lateral direction beneath the floor, and wherein the post is operatively connected to the cross member.

19. The bed of claim 12, further including an outer body panel operatively connected to the bed, and wherein the outer body panel covers at least a portion of one of the first side wall or the second side wall.

20. The bed of claim 19, further including a connecting panel, wherein the outer body panel is operatively connected to the bed by the connecting panel.

* * * * *